(12) United States Patent
Rofougaran et al.

(10) Patent No.: US 11,381,301 B2
(45) Date of Patent: Jul. 5, 2022

(54) INTEGRATED REPEATER SYSTEM AND METHOD TO OPERATE INTEGRATED REPEATER SYSTEM

(71) Applicant: Movandi Corporation, Irvine, CA (US)

(72) Inventors: Ahmadreza Rofougaran, Newport Beach, CA (US); Alfred Grau Besoli, Irvine, CA (US)

(73) Assignee: Movandi Corporation, Irvine, CA (US)

( * ) Notice: Subject to any disclaimer, the term of this patent is extended or adjusted under 35 U.S.C. 154(b) by 0 days.

(21) Appl. No.: 17/341,370

(22) Filed: Jun. 7, 2021

(65) Prior Publication Data

US 2021/0297145 A1    Sep. 23, 2021

Related U.S. Application Data

(63) Continuation of application No. 16/865,013, filed on May 1, 2020, now Pat. No. 11,038,581.

(60) Provisional application No. 62/841,369, filed on May 1, 2019.

(51) Int. Cl.
  *H04B 7/155*  (2006.01)
  *H04W 16/28*  (2009.01)

(52) U.S. Cl.
  CPC ........ *H04B 7/15542* (2013.01); *H04W 16/28* (2013.01)

(58) Field of Classification Search
  CPC ........... H04B 7/15535; H04B 7/15542; H04W 16/28; H01Q 3/2658
  See application file for complete search history.

(56) References Cited

U.S. PATENT DOCUMENTS

| | | | |
|---|---|---|---|
| 8,489,019 B2 * | 7/2013 | Rofougaran | H04B 7/15571 455/10 |
| 2006/0040615 A1 * | 2/2006 | Mohamadi | H04B 7/0613 455/25 |
| 2009/0088071 A1 * | 4/2009 | Rofougaran | H04B 7/15535 455/13.1 |
| 2009/0264066 A1 * | 10/2009 | Cheng | H04B 7/185 455/12.1 |
| 2017/0185133 A1 * | 6/2017 | Browning | G06F 1/329 |
| 2017/0257460 A1 * | 9/2017 | Candelore | H04W 52/46 |
| 2020/0136718 A1 * | 4/2020 | Fang | H03F 3/213 |
| 2020/0144692 A1 * | 5/2020 | Kum | H01Q 1/007 |

OTHER PUBLICATIONS

Notice of Allowance for U.S. Appl. No. 16/865,013 dated Feb. 16, 2021.

* cited by examiner

*Primary Examiner* — Raymond S Dean
(74) *Attorney, Agent, or Firm* — Chip Law Group

(57) ABSTRACT

An integrated repeater system that includes a repeater device having phased array antenna receivers that receives a mmWave radio frequency signal from a base station, and one or more phased array antenna transmitters that transmits the received mmWave radio frequency signal through a glass structure to a user equipment with a first level of transmission loss. Based on an impedance matching component provided in the integrated repeater system, the repeater device changes a filter response of the glass structure based on a dielectric property of the impedance matching component.

20 Claims, 9 Drawing Sheets

INTEGRATED REPEATER SYSTEM AND METHOD TO OPERATE INTEGRATED REPEATER SYSTEM

CROSS-REFERENCE TO RELATED APPLICATIONS/INCORPORATION BY REFERENCE

This Patent Application makes reference to, claims priority to, claims the benefit of, and is a Continuation Application of U.S. patent application Ser. No. 16/865,013, filed on May 1, 2020, which claims priority to U.S. Provisional Patent Application Ser. No. 62/841,369, filed on May 1, 2019, the entire content of which is hereby incorporated herein by reference.

FIELD OF TECHNOLOGY

Certain embodiments of the disclosure related to a wireless telecommunication system. More specifically, certain embodiments of the disclosure relate to an integrated repeater system and method to operate the integrated repeater system.

BACKGROUND

Next generation of wireless telecommunication technologies (e.g. 5G or upcoming 6G) are being developed to deliver much faster data rate as compared to data rate provided by long term evolution (LTE or 4G) technology. Emergence of such next generation of wireless telecommunication technologies, for example, in cm-wave and mm-wave bands, is introducing new opportunities as well as new technical challenges. For example, there is a high transmission loss (also called transmittance loss or attenuation) through signal-obstructing physical objects at high radio frequencies. The high radio frequencies, such as the cm-wave and mm-wave radio signals, demonstrate high transmission losses when propagating through typical signal-obstructing physical objects, such as low emissivity (low-e) glass, tinted glass, other glasses or glass-like objects, when compared to sub-5 GHz radio signals, which is not desirable. In an example, it is observed that low-e glass windows have large insertion loss at mm-wave frequencies, for example, about around 30-40 decibels (dB). This causes insufficient 5G signal strength within buildings having such signal-obstructing physical objects. Current studies indicate that at 28 GHz, transmission loss (or attenuation) through coated glass windows, may be in a range of 25 to 60 dB. Further, it is observed that even clear non-tinted glass has transmission loss of about 4 dB. Moreover, it is further observed that at 28 GHz, indoor drywall attenuation may be about 7 dB. Thus, it can be estimated that by adding up the free space loss and losses through different materials, even receiving a signal from an outdoor cell site to a user at home or in a cluttered office environment is a huge technical challenge. Furthermore, conventional repeater systems and their antennas are normally designed to operate in open air. It is observed that when they are placed near the glass structures, their performance is further degraded, and a lower output power may be expected from such conventional repeater systems, which is not desirable.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY OF THE DISCLOSURE

An integrated repeater system and method to operate the integrated repeater system for high network performance, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION OF THE DISCLOSURE

Certain embodiments of the disclosure may be found in an integrated repeater system and method to operate the integrated repeater system. Currently, there are many technical problems associated with conventional repeater systems. For example, in a first technical problem, it is observed that low-e glass windows, for example, those with low-e double glazed glass, have large transmission loss at mm-wave frequencies, for example, about around 30-40 decibels (dB).

This causes insufficient 5G signal strength within buildings having such low-e glass structures. In a second technical problem, it is observed that when conventional repeater systems are placed near the low-e glass structures, their performance is further degraded, for example, a lower output power is achieved from the conventional repeater systems, which results in low signal strength of signals within buildings and lower data rates. In addition to the large transmission loss of the low-e glass structures (i.e. low-e glass coating), there is an additional problem of the filtering effect of the double-glazing glass structure (e.g. glass/air/glass) in terms of frequency and scan direction of signals. The disclosed integrated repeater system is an improved repeater system that not only mitigates, for example, the aforementioned technical problems, but also provides a low-power, low-latency, low-heating solution, and ensures almost no transmission loss or at least significantly reduced transmission loss of mmWave radio frequency signal when passed through such low-e glass structures or the low-e double glazed glasses. Moreover, existing repeater systems require two or more network nodes (conventional repeater devices) that needs to be placed on either side of such low-e glass structures to boost signal strength to certain extent. In contradiction to existing systems, the disclosed integrated repeater system may be referred to as one-sided repeater system as only one repeater device may be arranged at one side of such low-e glass structures or the low-e double glazed glasses, thereby reducing form factor, cost, while at the same time improving signal quality in terms of signal strength and increased data rates (e.g. multigigabit data rates). In the following description, reference is made to the accompanying drawings, which form a part hereof, and in which is shown, by way of illustration, various embodiments of the present disclosure.

Figure 1:
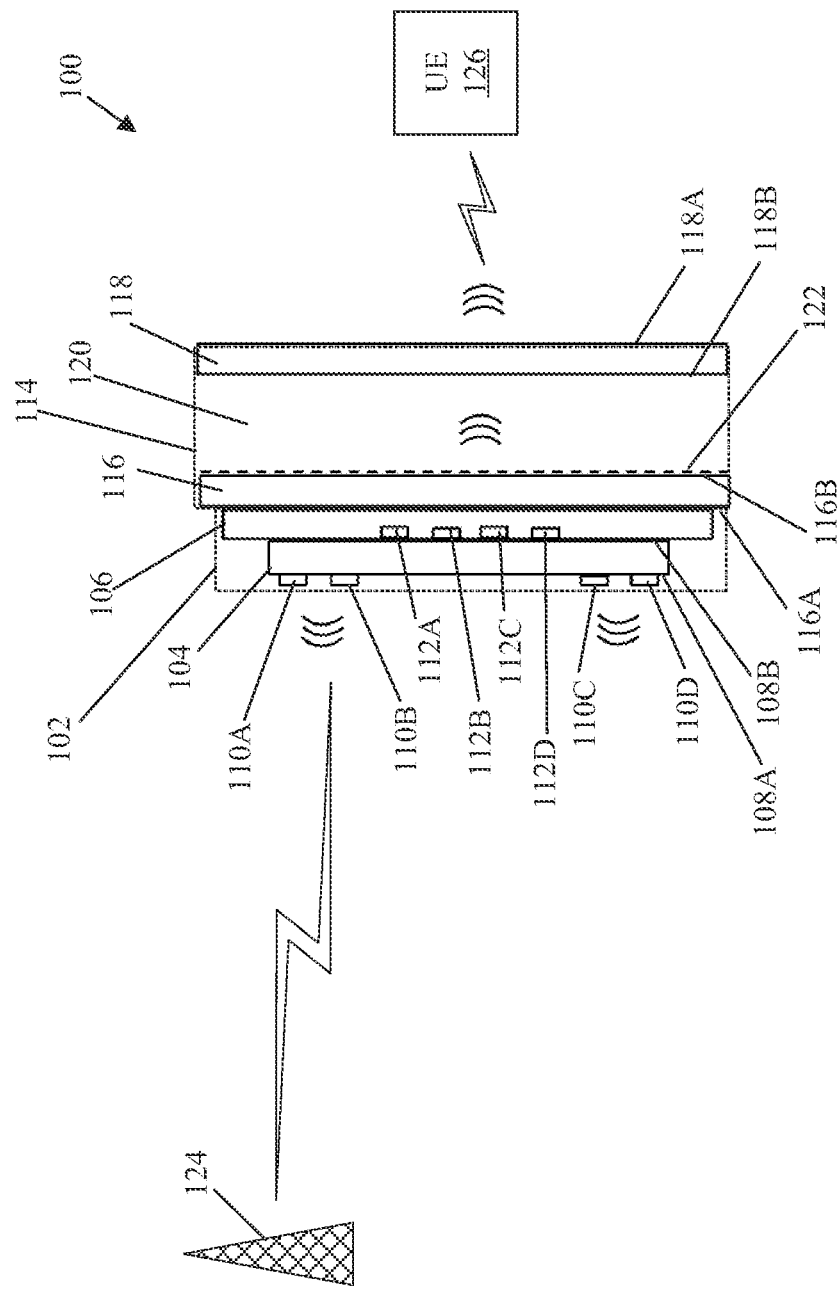
FIG. 1 is a network environment diagram that illustrates an exemplary integrated repeater system for high network performance, in accordance with an exemplary embodiment of the disclosure.

FIG. 1 is a network environment diagram that illustrates an exemplary integrated repeater system for high network performance, in accordance with an exemplary embodiment of the disclosure. With reference to FIG. 1, there is shown a network environment diagram 100 that may include an integrated repeater system 102, a base station 124, and a user equipment (UE) 126. The integrated repeater system 102 may include a repeater device 104 and an impedance matching component 106.

The integrated repeater system 102 may include suitable logic, circuitry, and/or interfaces that may be configured to receive a mmWave radio frequency signal from the base station 124 and provide the mmWave radio frequency signal with reduced transmission loss or almost no transmission loss to the user equipment 126. Similarly, the integrated repeater system 102 may be configured to receive a mmWave radio frequency signal from the user equipment 126 in an uplink communication, and provide the mmWave radio frequency signal with reduced transmission loss or almost no transmission loss to the base station 124. The repeater device 104 of the integrated repeater system 102 may be configured to operate in mmWave radio frequency range for cellular communication. In another implementation, the repeater device 104 may support multiple and a wide range of frequency spectrum, such as 3G, 4G, 5G NR, or true 5G. In some embodiments, multiple frequency spectrums may be supported together. For 5G NR, there may be two NR frequency Ranges (frequency range 1 and 2) that may be utilized for practical implementations. Frequency range 1 may overlap and extend 4G LTE frequencies, operating from 450 MHz to 6,000 MHz, which is also commonly referred to as NR or sub-6 gigahertz (GHz). Frequency range 2 operates at a much higher about 24 GHz to 52 GHz, which is commonly also referred to as millimeter wave (mmWave), although 'millimeter' frequency length typically begins at 30 GHz. Examples of the repeater device 104 may include, but is not limited to a 5G wireless access point, an evolved-universal terrestrial radio access-new radio (NR) dual connectivity (EN-DC) device, a NR-enabled repeater device, a NR-enabled repeater device or system.

The repeater device 104 may have a first surface 108A and a second surface 108B that is opposite the first surface 108A. In accordance with an embodiment, the repeater device 104 may have an elongated rectangular box-like structure having four surfaces, where the first surface 108A may be opposite the second surface 108B, and a third surface may be opposite the fourth surface. In an implementation, the first surface 108A and the second surface 108B may be greater in size than the third surface and the fourth surface. In another implementation, the first surface 108A and the second surface 108B may be same in size than the third surface and the fourth surface. In accordance with an embodiment, the repeater device 104 may further include a heat sink (not shown). In an implementation, the heat sink may be arranged at any one of the third surface or the fourth surface. The heat sink acts a thermal conductor that dissipates away the heat generated by the repeater device 104, thereby allowing regulation of the temperature of the repeater device 104 at levels suitable for functioning of the repeater device 104.

The repeater device 104 may further comprise one or more phased array antenna receivers, such as a first phased array antenna receiver 110A, a second phased array antenna receiver 110B, a third phased array antenna receiver 110C, and a fourth phased array antenna receiver 110D. In accordance with an embodiment, each of the one or more phased array antenna receivers are implemented as a hardware antenna module or a chip having a number of antenna elements. In an example, each of the antenna elements may be a patch antenna (i.e. also referred to as a patch radiator or a patch radiating element). In an example, each phased array antenna receiver may include "X" number of elements in a shape of a square, where a size of each side of the square may be in a range from 11, 13, 15, 17, 19, 21 mm up to 13, 15, 17, 19, 21, or 23 mm respectively, and where X" may be one of: 4, 6, 8, 10, 12, 14, 16, 18, or 20 elements. In an implementation, each phased array antenna receiver may have 16 elements (4×4) with a size of about 23.6×23.6 mm2. In an example, the antenna elements may be spaced in a range of 2, 3, 4, or 5 mm up to 3, 4, 5, 6 mm. In an implementation, the antenna elements are spaced about 5.9 mm, so the actual size of each 32-element phased array aperture is about 47.2×23.6 mm2. The one or more phased array antenna receivers are configured to receive a mmWave radio frequency signal from the base station 124. In an implementation, the one or more phased array antenna receivers (i.e. the first phased array antenna receiver 110A, the second phased array antenna receiver 110B, the third phased array antenna receiver 110C, and the fourth phased array antenna receiver 110D) are arranged on the first surface 108A, as shown. An example of the one or more phased array antenna receivers is further described, for example, in FIG. 3.

The repeater device 104 may further comprise one or more phased array antenna transmitters, such as a first phased array antenna transmitter 112A, a second phased array antenna transmitter 112B, a third phased array antenna transmitter 112C, and a fourth phased array antenna transmitter 112D. In accordance with an embodiment, each of the one or more phased array antenna transmitters are implemented as a hardware antenna module or a chip having a number of antenna elements similar to that of the one or more phased array antenna receivers. In an example, each of the antenna elements may be a patch antenna (i.e. also referred to as a patch radiator or a patch radiating element). In an example, similar to that of the phased array antenna receiver, each phased array antenna transmitter may include "X" number of elements in a shape of a square, where a size of each side of the square may be in a range from 11, 13, 15, 17, 19, 21 mm up to 13, 15, 17, 19, 21, or 23 mm respectively, and where X" may be one of: 4, 6, 8, 10, 12, 14, 16, 18, or 20 elements. In an implementation, each phased array antenna transmitter may have 16 elements (4×4) with a size of about 23.6×23.6 mm2. In an implementation, the repeater device 104 may have a direct current (DC) power consumption of about 10-20 W (in conventional devices, the power consumption is typically more than 25-26 W or more). The spacing antenna elements may be similar to that of the spacing of antenna elements of the one or more phased array antenna receivers. In an implementation, the one or more phased array antenna transmitters (such as the first phased array antenna transmitter 112A, the second phased array antenna transmitter 112B, the third phased array antenna transmitter 112C, and the fourth phased array antenna transmitter 112D) may be arranged on the second surface 108B. The first surface 108A of the repeater device 104 may face towards the base station 124, whereas the second surface 108B may face towards the glass structure 114. In another implementation, the one or more phased array antenna transmitters may be arranged on the first surface 108A. The one or more phased array antenna transmitters are configured to transmit the received mmWave radio frequency signal through a glass structure 114 to the user equipment 126. The transmitted mmWave radio frequency signal after propagation through the glass structure 114 may have a first level of transmission loss. An example of the one or more phased array antenna transmitters is further described, for example, in FIG. 3.

Alternatively, in an embodiment, beneficially, the one or more phased array antenna receivers and one or more phased array antenna transmitters are integrated into one phased array antenna transceiver that comprises an array of antenna elements. In such an embodiment, the integrated phased array antenna transceiver may be arranged at the first surface 108A. Moreover, a size of the repeater device 104 may be in a range from approximately 5×5 cm² up to 8×8 cm² (including various components, such as the integrated one phased array antenna transceiver, a printed circuit board (e.g. motherboard) on which the one phased array antenna transceiver may be arranged, peripherals, etc.). In an exemplary implementation, the integrated phased array antenna transceiver may include a shared 32-elements (8×4) phased array antenna. The repeater device 104 may be configured to distribute (or share) a signal receiving function and a signal transmitting function among the array of antenna elements of the integrated one phased array antenna. In an embodiment, one or more integrated phased array antenna transceivers may be arranged in the repeater device 104, such as at the first surface 108A. In such a case, integrated phased array antenna transceiver that have 32 antenna elements may have a size of approximately 52×31 mm². The antenna elements may be spaced about 2-5.5 mm, specifically 5.2 mm, so the actual size of the 32-element phased array aperture may be about 41.6×20.8 mm². In such a case, as a result of the specific configuration of the integrated one phased array antenna, the power consumption of the repeater device 104 may be reduced significantly, for example, less than or equal to about 5 W. In accordance with an embodiment, the array of antenna elements of the integrated one phased array antenna may correspond to a micro-strip antenna element, or a metallic patch radiator printed on a substrate, for example, Silicon, Benzocyclobutane, Nylon, FR-4, and the like. The substrate may also be referred to as a printed circuit board. Thus, the integrated repeater system 102 may also include the printed circuit board. Similarly, the one or more phased array antenna receivers and the one or more phased array antenna transmitters are printed on a same printed circuit board or a separate printed circuit board. An example of the integrated phased array antenna transceiver is further described, for example, in FIG. 4.

In accordance with an embodiment, the glass structure 114 may be present near the repeater device 104. In an implementation, the repeater device 104 may be attached or integrated with the glass structure 114. In an example, the repeater device 104 may be removably attached to the glass structure 114. In another example, the repeater device 104 may be integrated as a unitary part (non-separable part of the glass structure 114). In another implementation, the repeater device 104 may be arranged at a certain proximal distance from the glass structure 114 (i.e. near the glass structure 114 but not attached or integrated with the glass structure 114).

In accordance with an embodiment, the glass structure 114 may be a low-emissivity double-glazed structure having two layers of glass with an air gap 120 between the two layers of glass. A first layer 116 of the two layers of glass may have a first outer surface 116A facing the second surface 108B of the repeater device 104 and a first inner surface 116B facing the air gap 120. A second layer 118 of glass may have a second outer surface 118A and a second inner surface 118B facing the first inner surface 116B. Alternatively, the glass structure 114 may be a low-emissivity multiple-glazed structure having more than two layers of glass with one or more fillings or air gap. In addition to the large transmission loss of the low-e glass coating, there is an additional problem related to the filtering effect of the double-glazing glass (DGU) structure (i.e. glass/air/glass) with respect to frequency and scan direction. Typically, multiple layers (or panes) of glass in a window unit causes additional interference. For example, double or triple-glazed windows may more block signals than single-glazed windows, and triple glazed may block more signals than double glazed and single-glazed windows. Thus, modern windows and glass fittings on buildings with emission-reducing (Low-E) coatings deflect even more radio frequency signal, reduce the power of the signal, or interfere with the scan direction, resulting in the filtering effect in addition to the significant level of transmission loss (e.g. the first level of transmission loss).

In some embodiments, beneficially, the integrated repeater system 102 comprises a patterned coating 122 provided at the glass structure 114. The patterned coating 122 refers to a coating on low-e glass windows, which may be patterned to produce one or more passage (or openings) for mmWave frequencies (while still blocking ultra violet (UV) radiation and heat). In an example, a frequency-selective surface (FSS) based patterning may be applied. The patterned coating 122 reduces the first level of transmission loss, but only up 10 dB. In other words, even with the patterned coating 122, the expected insertion loss (or transmission loss) through the glass structure 114 is detected equal to or below 10 dB. In this case, the patterned coating 122 is provided on the first inner surface 116B of the first layer 116 of the glass structure 114. Beneficially, it is observed that when a single-sided integrated repeater, such as the integrated repeater system 102, may be arranged on the interior side of the window, i.e., the first inner surface 116B of the first layer 116 of the glass structure 114, the first level of transmission loss is reduced more than 10 dB (i.e. improved handing of transmission loss). In such a case, the repeater device 104 may be a fully integrated repeater on a glass window/frame (i.e. the glass structure 114) or a miniaturized repeater device 104 placed nearby the glass structure 114.

Advantageously, the impedance matching component 106 of the integrated repeater system 102 further improves the signal quality. The impedance matching component 106 may also be referred to as an impedance matching layer provided on the second surface 108B of the repeater device 104. The impedance matching component 106 having a dielectric property may be arranged between the second surface 108B and the glass structure 114. In an implementation, specifically, the impedance matching component 106 may be attached to (or arranged on) the second surface 108B of the repeater device 104 and the first outer surface 116A of the glass structure 114.

In accordance with an embodiment, the dielectric property of the impedance matching component 106 corresponds to a dielectric constant that may be in a range of, for example, 2 to 4. The term 'impedance matching' refers to a process of making one impedance look like another. In this case, the impedance of the one or more phased array antenna transmitters may be matched with impedance of the glass structure 114 to achieve maximum power transfer of the mmWave radio frequency signal outputted from the one or more phased array antenna transmitters through the glass structure 114.

The base station 124 may include suitable logic, circuitry, and/or interfaces that may be configured to communicate with the repeater device 104, and the user equipment 126 via the repeater device 104. Specifically, the base station 124 may be configured to transmit a mmWave radio frequency signal to the repeater device 104. Typically, bandwidth requirements serve as a guideline for a location of a base station and the count of base stations may be dependent on, for example, population density and geographic irregularities, such as buildings, monuments, and physical terrain such as mountain ranges, which may interfere with communication of radio frequency signals (or beams of radio frequency signals). The integrated repeater system 102 may be deployed between the base station 104 and one or more communication devices, such as the user equipment 126 to mitigate lack of line-of-sight or other communication issues between the base station 104, and the one or more communication devices. Examples of the base station 104 may include, but is not limited to, an evolved Node B (eNB), a Next Generation Node B (gNB), and the like.

The user equipment 126 refers to a telecommunication hardware used by an end-user to communicate. Alternatively stated, the user equipment 126 may refer to a combination of mobile equipment and subscriber identity module (SIM). Examples of the user equipment 126 may include, but are not limited to a smartphone, a mobile communication equipment, a customer premise equipment (CPE), a high definition media device, or any other customized hardware for telecommunication.

In operation, the repeater device 104 may be configured to receive a mmWave radio frequency signal from the base station 124. The repeater device 104 may be further configured to transmit the received mmWave radio frequency signal through the glass structure 114 to the user equipment 126, where the transmitted mmWave radio frequency signal after propagation through the glass structure 114 has a first level of transmission loss. Based on the impedance matching component 106, the repeater device 104 may be further configured to tune an impedance of the one or more phased array antenna transmitters (such as the first phased array antenna transmitter 112A, the second phased array antenna transmitter 112B, the third phased array antenna transmitter 112C, and the fourth phased array antenna transmitter 112D) in accordance with the glass structure 1114. The impedance in the one or more phased array antenna transmitters may be detected and the detected impedance may be matched (i.e. tuned) with the impedance of the glass structure 114 such that the impedances the one or more phased array antenna transmitters and the glass structure 114 may be same or approximately same. The tuning of the impedance results in an increase in the power of the signals (i.e. significantly improved signal strength) transmitted from the one or more phased array antenna transmitters even after such signals passes through the glass structure 114. Based on the impedance matching component 106, the repeater device 104 may be further configured to change a filter response of the glass structure 114 such that the transmitted mmWave radio frequency signal after propagation through the impedance matching component 106 and the glass structure 114 has at least one of: no transmission loss at a frequency of the transmitted mmWave radio frequency signal or a second level of transmission loss that may be less than the first level of transmission loss. In other words, the impedance matching component 106 enables changing of the filter response of the glass structure 114 (versus frequency and scan angle) such that the transmission loss (i.e. transmission dip) happens at some other frequencies and not the frequency of the transmitted mmWave radio frequency signal or it may be not as profound as typically observed in double glazing glasses. For example, the first level of transmission loss may be about 30-40 decibels (dB), whereas the second level of transmission loss may be significantly less than 30 dB, such as 0 dB, 1 dB, 2 dB, 3 dB, 4 dB, 5 dB, or less than 10-12 dB in an example. The change of filter response corresponds to reducing the filtering effect.

In accordance with an embodiment, the integrated repeater system 102 further comprises a lens arranged at the glass structure 114. The lens may increase a scanning range of the repeater device 104 such that the transmitted mmWave radio frequency signal after propagation through the impedance matching component 106, the glass structure 114, and further through the lens has an increased antenna gain, an increased scanning range, and almost no transmission loss at the frequency of the transmitted mmWave radio frequency signal. In some implementations, the transmitted mmWave radio frequency signal after propagation through the impedance matching component 106, the glass structure 114, and further through the lens has the second level of transmission loss that may be less than the first level of transmission loss. The lens and its arrangement in the integrated repeater system 102 are further described in detail, for example, in FIG. 2A to 2C.

In accordance with another embodiment, in the uplink communication, for example, similarly, the repeater device 104 may be configured to receive a mmWave radio frequency signal from the user equipment 126 through the glass structure 114, where the received mmWave radio frequency signal after propagation through the glass structure 114 has a first level of transmission loss. Based on the impedance matching component 106, the repeater device 104 may be further configured to tune an impedance of the one or more phased array antenna receivers and the one or more phased array antenna transmitters in accordance with the glass structure 114. The impedance in the one or more phased array antenna receivers and the one or more phased array antenna transmitters may be detected and the detected impedance may be matched (i.e. tuned) with the impedance of the glass structure 114 such that the impedances the one or more phased array antenna receivers and transmitters and the glass structure 114 may be same or approximately the same. Based on the impedance matching component 106, the repeater device 104 may be further configured to change a filter response of the glass structure 114. The repeater device 104 may be further configured to transmit the received mmWave radio frequency signal after propagation through the impedance matching component 106 and the glass structure 114 to the base station 124 such that the transmitted mmWave radio frequency signal has at least one of: no transmission loss at a frequency of the transmitted mmWave radio frequency signal or a second level of transmission loss that may be less than the first level of transmission loss. In other words, the impedance matching component 106 enables changing of the filter response of the glass structure 114 (versus frequency and scan angle) such that the transmission loss (i.e. transmission dip) happens at some other frequencies and not the frequency of the transmitted mmWave radio frequency signal or it may be not as profound as typically observed in double glazing glasses.

Figure 2A:
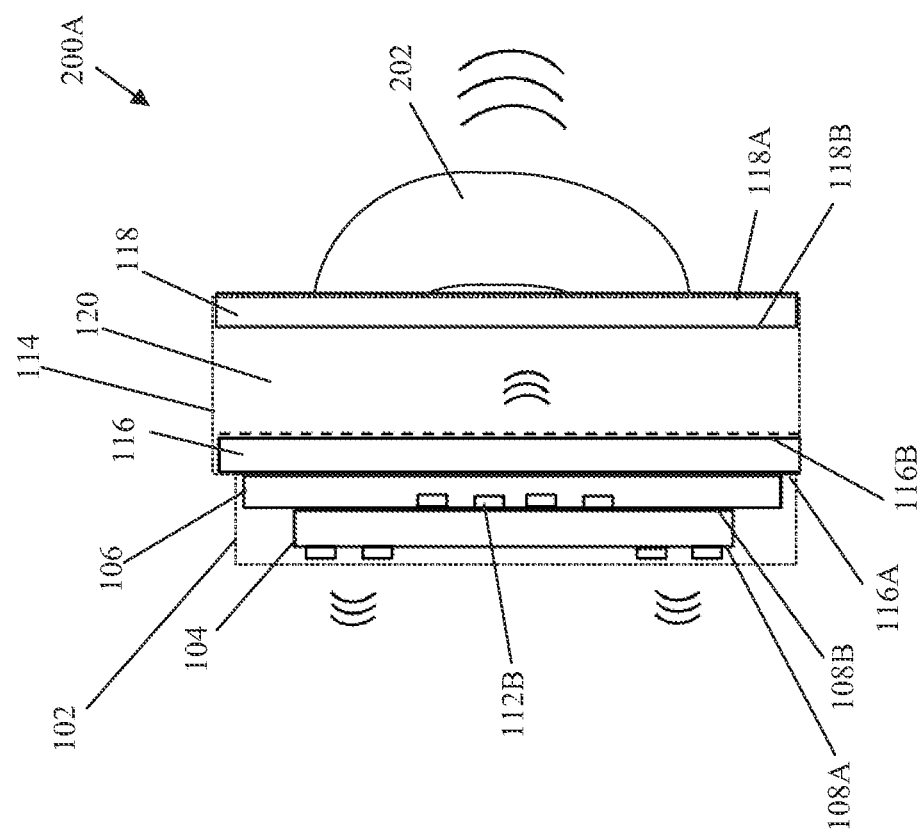
FIG. 2A is an illustration of an exemplary integrated repeater system for high network performance, in accordance with another exemplary embodiment of the disclosure.

FIG. 2A is an illustration of an exemplary integrated repeater system for high network performance, in accordance with another exemplary embodiment of the disclosure. With reference to FIG. 2A, there is shown an integrated repeater system 200A. In this embodiment, the integrated repeater system 200A further includes a lens 202.

In accordance with an embodiment, the glass structure 114 may be a low-emissivity double-glazed structure having two layers of glass with the air gap 120 between the two layers of glass. The first layer 116 of the two layers of glass has a first outer surface 116A facing the second surface 108B of the repeater device 104 and the first inner surface 116B facing the air gap 120. The glass structure 114 may the second layer 118 of glass has the second outer surface 118A facing the lens 202 and the second inner surface 108B facing the first inner surface 116B. In this case, the lens 202 may be arranged on the second outer surface 118A of the glass structure 114. In such a case, the transmitted mmWave radio frequency signal after propagation through the impedance matching component 106 and the glass structure 114 further passes through the lens 202. The repeater device 104 may be further configured to excite a subset of antenna elements of the one or more phased array antenna transmitters. For example, a subset of antenna elements (16 antenna elements or 8 antenna elements of the second phased array antenna transmitter 112B may be excited out of 32 or 16 elements respectively). In another example, all antenna elements of only one phased array antenna transmitter from multiple phased array antenna transmitters, may be excited. The subset of antenna elements may be excited when the mmWave radio frequency signal is to be transmitted to the user equipment 126 through the impedance matching component 106, the glass structure 114, and the lens 202. The repeater device 104 may be further configured to execute a switched beamforming from the excited subset of antenna elements based on the lens 202 in order to switch between a plurality of beams of mmWave radio frequency signals that points to different directions. In the conventional repeater systems, all the elements of the one or more phased array antenna receivers and the one or more phased array antenna transmitters (i.e. Tx/Rx array) are excited to beamform, which produces continuous beamforming, and thus is not power efficient and is computational resource intensive. In contradiction to the conventional systems, in the repeater device 104 that is lens enhanced (i.e. the integrated repeater system 200A), not all the elements of the TX/RX array are excited, and only the subset of antenna elements may be excited to switch between beams of radio frequency signals pointing into different directions, thereby producing switched beamforming, which is power efficient and not computational resource intensive.

In accordance with an embodiment, in the integrated repeater system 200A, the lens 202 may be arranged at the glass structure 114 such that a scanning range of the one or more phased array antenna transmitters may be increased for the execution of the switched beamforming. The increase in the scanning range improves the number of users that can be supported by the integrated repeater system 200A. For example, an increased number of user equipment may then be supported. The lens 202 when arranged at the glass structure 114 not only increases the scanning range of the repeater device 104, but also increases an antenna gain while maintaining no transmission loss at the frequency of the transmitted mmWave radio frequency signal or a third level of transmission loss that is less than the first level of transmission loss and the second level of transmission loss. In other words, the lens 202 placed on the exterior of the window glass (i.e. the lens 202 arranged on the second outer surface 118A of the glass structure 114) is advantageous as it boosts antenna gain, increases scanning ranges, and at the same time enables switched beamforming in power efficient manner.

In accordance with an embodiment, the integrated repeater system 200A that includes the lens 202 may further facilitate robust communication for millimeter wave enabled devices at frequency bands and increased data rates (multi gigabit data rate) that support the "4G", "5G" or higher (nG) standards. In an implementation, a single lens may be used in the integrated repeater system 200A. In another implementation, a plurality of lenses may be used in the integrated repeater system 200A depending on the transmission loss detected in the transmitted mmWave radio frequency signal after passing through the glass structure 114. The lens 202 may be made of glass or plastic material, and may have a defined shape and a defined distribution of dielectric constant. For example, the dielectric constant may be in a range of 2 to 4. The defined shape may be one of a convex shape, a squared lens shape, a rectangular lens shape, or an arbitrary lens shape. The lens 202 may have an arrangement of an aperture, referred to as a lens aperture, which may be much larger than the array aperture to provide more antenna gain. The array aperture may also be referred to as antenna aperture, which may be refer to an area, oriented perpendicular to the direction of an incoming electromagnetic wave (e.g. mmWave radio frequency signal), which may intercept the same amount of power from that wave as may be produced by the antenna receiving it. Alternatively, a size of the of the one or more phased array antenna transmitters may be defined by its aperture. In an example, there may be a tradeoff between the size of the lens 202 and scanning range of the repeater device 104 as a result of the arrangement of the lens 202. In some embodiments, for example, in this case, the glass structure 114 may not necessarily need to be patterned.

Figure 2B:
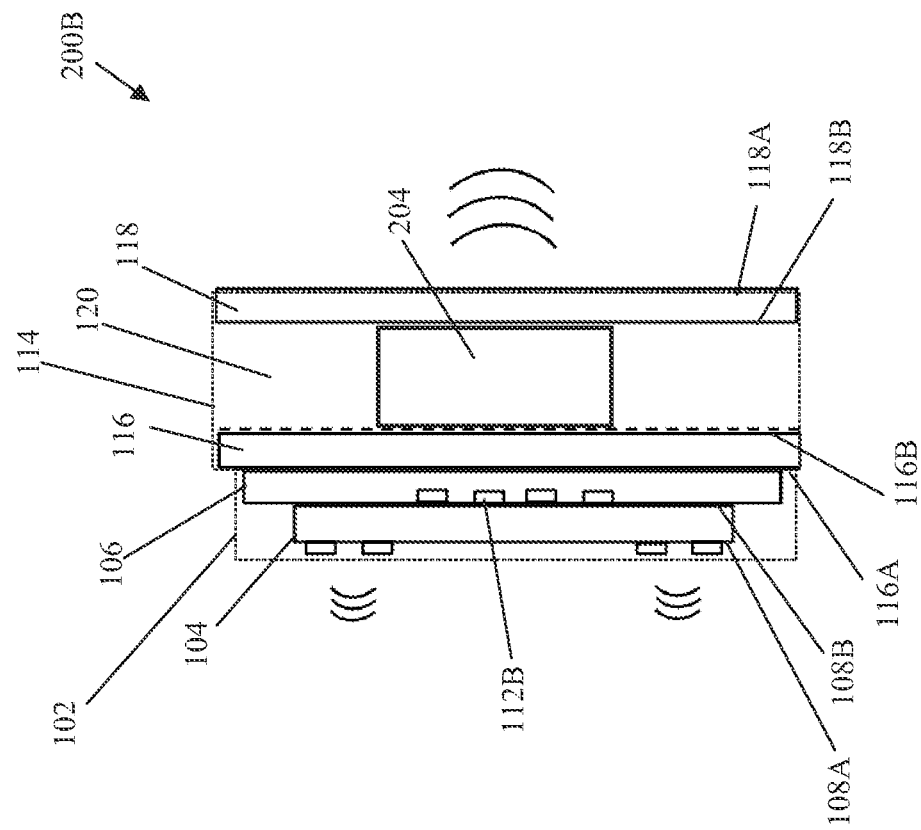
FIG. 2B is an illustration of an exemplary integrated repeater system for high network performance, in accordance with yet another exemplary embodiment of the disclosure.

FIG. 2B is an illustration of an exemplary integrated repeater system for high network performance, in accordance with another exemplary embodiment of the disclosure. With reference to FIG. 2B, there is shown an integrated repeater system 200B. In this embodiment, the integrated repeater system 200B further includes a lens 204.

In accordance with an embodiment, the glass structure 114 may be a low-emissivity double-glazed structure having two layers of glass with the air gap 120 between the two layers of glass. The first layer 116 of the two layers of glass has a first outer surface 116A facing the second surface 108B of the repeater device 104 and the first inner surface 116B facing the air gap 120. The glass structure 114 may the second layer 118 of glass has the second outer surface 118A and the second inner surface 118B facing the air gap 120 and the first inner surface 116B. In this case, the lens 204 may be arranged in the air gap 120 between the first inner surface 116B and the second inner surface 118B. In such a case, the transmitted mmWave radio frequency signal after propagation through the impedance matching component 106 passes through the glass structure 114 (which includes integrated lens 204). Thus, the transmitted mmWave radio frequency signal passes through the lens 204 while passing through the glass structure 114. Such an arrangement achieves all the technical effect and advantages as of the arrangement of the lens 202 in FIG. 2A. Moreover, such an arrangement has an additional advantage of reducing the form factor, that is reducing the size (increasing compactness) of the integrated repeater system 102 as the lens is within the glass structure 114.

Figure 2C:
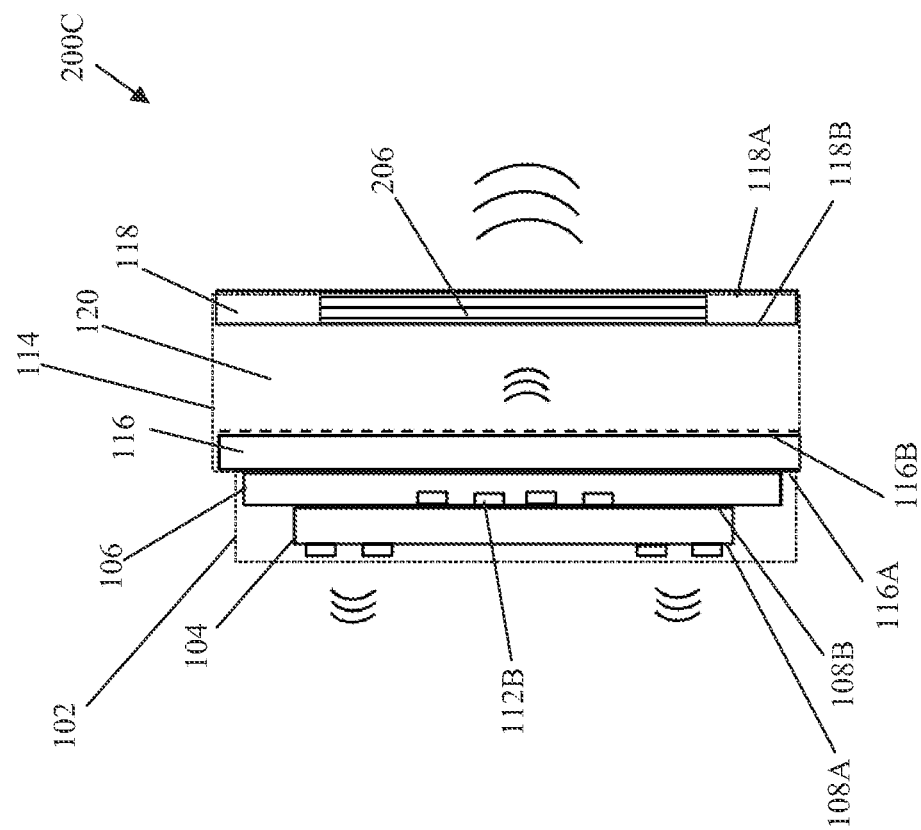
FIG. 2C is an illustration of an exemplary integrated repeater system for high network performance, in accordance with another exemplary embodiment of the disclosure.

FIG. 2C is an illustration of an exemplary integrated repeater system for high network performance, in accordance with another exemplary embodiment of the disclosure. With reference to FIG. 2C, there is shown an integrated repeater system 200C. In this embodiment, the integrated repeater system 200C further includes a lens 206.

In accordance with an embodiment, the glass structure 114 may be a low-emissivity double-glazed structure having two layers of glass with the air gap 120 between the two layers of glass. The first layer 116 of the two layers of glass has a first outer surface 116A facing the second surface 108B of the repeater device 104 and the first inner surface 116B facing the air gap 120. The glass structure 114 may include the second layer 118 of glass that has the second outer surface 118A and the second inner surface 118B facing the air gap 120 and the first inner surface 116B. In this embodiment, the lens 206 may be integrated or patterned in at least one of the two layers of glass of the glass structure 114. In this case, as shown in the FIG. 2C, in an example, the lens 206 may be patterned in the second layer 118 of the two layers of glass of the glass structure 114. Such an arrangement achieves all the technical effect and advantages as the arrangement of the lens 204 in FIG. 2A. Moreover, such an arrangement has an additional advantage of further reducing the size of the glass structure 114 as well as the size (increasing compactness) of the integrated repeater system 102 as the air gap 120 devoid of any lens may be reduced. In an implementation, the air gap 120 may filled with atmospheric air. In another implementation, the air gap 120 may be filled with known gases that helps in reducing UV radiation and heat conduction, do not interfere with visibility, and/or facilitate reducing transmission loss.

Figure 3:
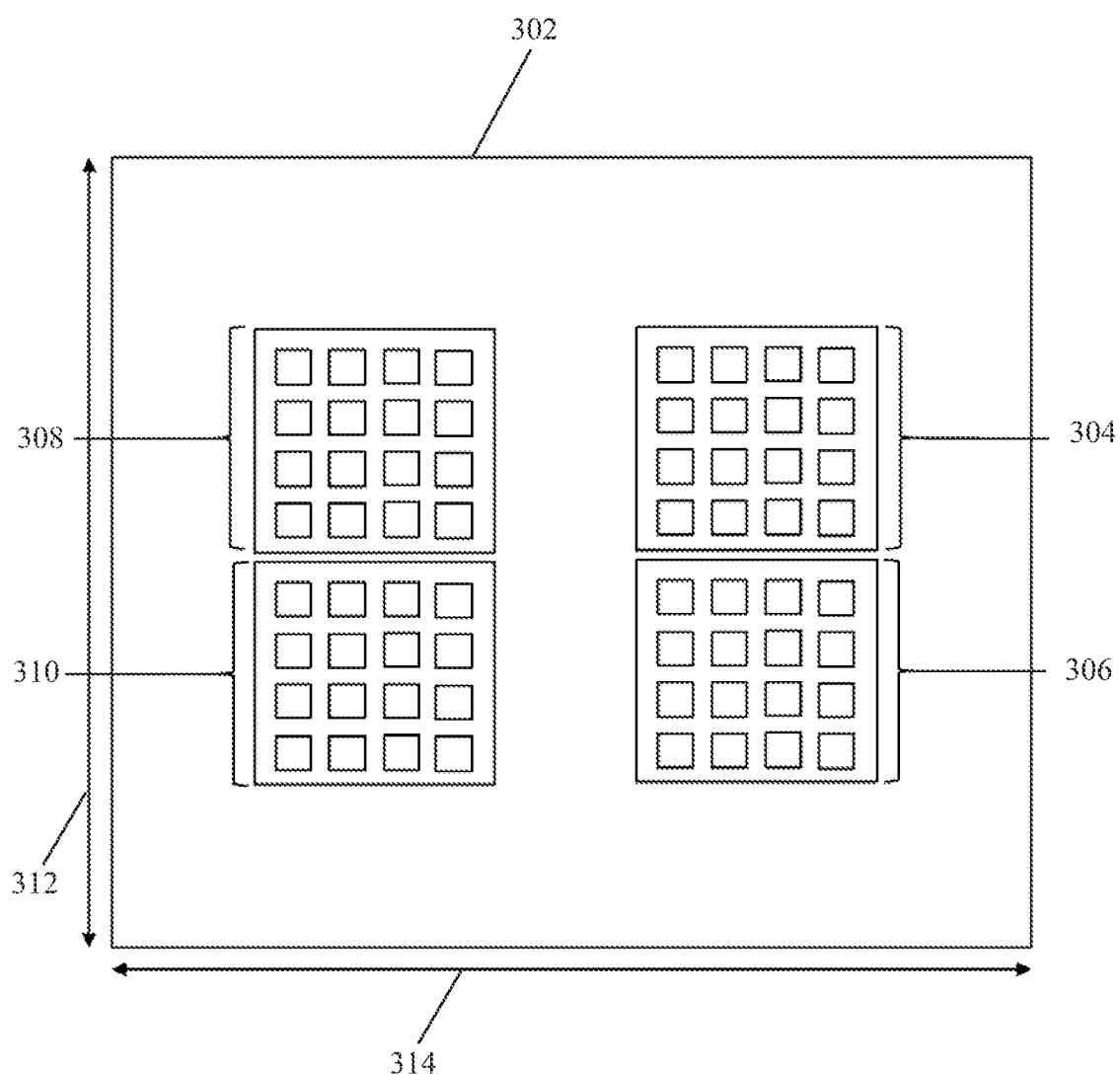
FIG. 3 is an illustration of an exemplary phased array antenna receivers and phased array antenna transmitters of a repeater device of an integrated repeater system, in accordance with an exemplary embodiment of the disclosure.

FIG. 3 is an illustration of an exemplary phased array antenna receivers and phased array antenna transmitters of a repeater device of an integrated repeater system, in accordance with an exemplary embodiment of the disclosure. With reference to FIG. 3, there is shown a motherboard 302 that includes separate hardware modules of phased array antenna receivers 304 and 306 and phased array antenna transmitters 308 and 310. In this exemplary embodiment, each of the phased array antenna receivers 304 and 306 as well as each of phased array antenna transmitters 308 and 310 may have 16 antenna elements (4×4) with a size of about 23.6×23.6 mm2, where the antenna elements are spaced about 5.9 mm, so the actual size of each 32-elements phased array aperture (i.e. a 32-element receiver and a 32-element transmitter) may be about 47.2×23.6 mm2. In this case, a size of a length 312 of the motherboard 302 may be about 8 cm and a size of a breadth 314 of the motherboard 302 may be also about 8 cm. The size of the repeater device 104 may be approximately same or similar to that of the size of the motherboard 302. For example, in this case, the size of the repeater device 104 may be approximately 8×8 cm$^2$ (including various components, such as peripherals, a printed circuit board (e.g. the motherboard 302) on which the phased array antenna receivers 304 and 306 as well as each of phased array antenna transmitters 308 and 310 may be arranged, etc.). In this embodiment, the motherboard 302 that includes separate hardware modules of phased array antenna receivers 304 and 306 and phased array antenna transmitters 308 and 310, may be arranged at the first surface 108A of the repeater device 104 such that the phased array antenna receivers 304 and 306 and phased array antenna transmitters 308 and 310 faces the base station 124 for uplink and downlink communication with the base station 124 via the integrated repeater system 102. The integrated repeater system 102 may be referred to as one-sided repeater system 102 as only one repeater device, such as the repeater device 104, may be arranged at one side of the glass structure 114. In accordance with an embodiment, similar to the motherboard 302, another motherboard that includes other phased array antenna receivers and phased array antenna transmitters, may also be arranged at the second surface 108B of the repeater device 104 such that the other phased array antenna receivers and the phased array antenna transmitters faces the UE 126 for downlink and uplink communication with the UE 126 via the integrated repeater system 102. Although the term motherboard 302 is utilized, the motherboard 302 may also be referred to as a circuit board.

Figure 4:
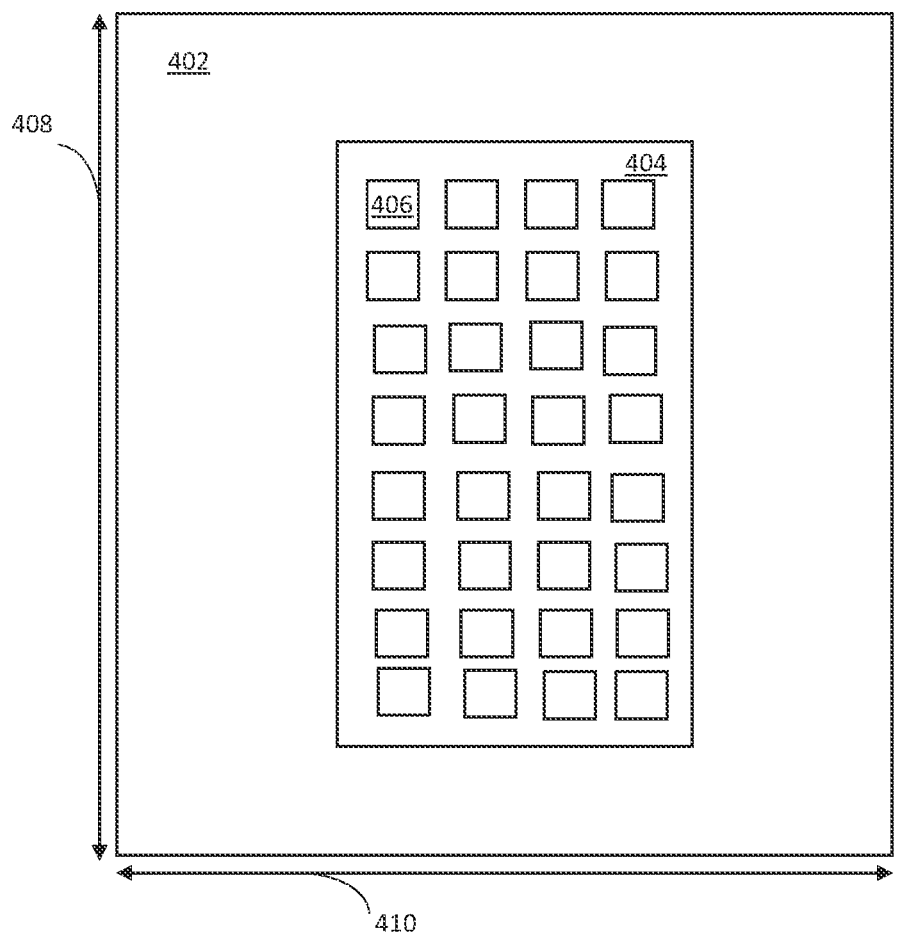
FIG. 4 is an illustration of an exemplary integrated phased array antenna transceiver of a repeater device of an integrated repeater system, in accordance with an exemplary embodiment of the disclosure.

FIG. 4 is an illustration of an exemplary integrated phased array antenna transceiver of a repeater device of an integrated repeater system, in accordance with an exemplary embodiment of the disclosure. With reference to FIG. 4, there is shown a motherboard 402 that includes an integrated phased array antenna transceiver 404 (i.e. an integrated hardware module) having an array of antenna elements 406. In this embodiment, the integrated phased array antenna transceiver 404 may include a shared 32-elements (8×4) phased array antenna. The repeater device 104 may be configured to distribute (or share) a signal receiving function and a signal transmitting function among the array of antenna elements 406 of the integrated phased array antenna transceiver 404. In an implementation, the integrated phased array antenna transceiver 404 may be arranged at the first surface 108A for uplink and downlink communication with the base station 124 via the integrated repeater system 102. Similarly, another integrated phased array antenna transceiver may be arranged at the second surface 108B for uplink and downlink communication with the UE 126 via the integrated repeater system 102.

In this embodiment, the integrated phased array antenna transceiver 404 that includes a shared 32-elements (8×4) phased array antenna may have a size of approximately 52×31 mm$^2$. The array of antenna elements 406 may be spaced about 2-5.5 mm, specifically 5.2 mm, so the actual size of the 32-element phased array aperture may be about 41.6×20.8 mm² (which may be less than the size of antenna configuration having separate hardware modules of phased array antenna receivers 304 and 306 and phased array antenna transmitters 308 and 310). In such a case, as a result of the specific configuration of the integrated phased array antenna transceiver 404, the power consumption of the repeater device 104 may be reduced significantly, for example, less than or equal to about 15 W (in case of antenna configuration having separate hardware modules of phased array antenna receivers 304 and 306 and phased array antenna transmitters 308 and 310, typically, the power consumption of the repeater device 104 increases by about 50% or more, for example, about an increase of about 9 to 10 W, for example, about 25 W (15+10=25 W)). Moreover, in this case, a size of a length 408 of the motherboard 402 may be about 8 cm and a size of a breadth 410 of the motherboard 402 may be also about 8 cm. The size of the repeater device 104 may be approximately same or similar to that of the size of the motherboard 402. As a result of the specific configuration of the integrated phased array antenna transceiver 404, more antenna elements may be packed as compared to antenna configuration of FIG. 3 or the size of the repeater device 104 may be comparatively more compact.

Figure 5:
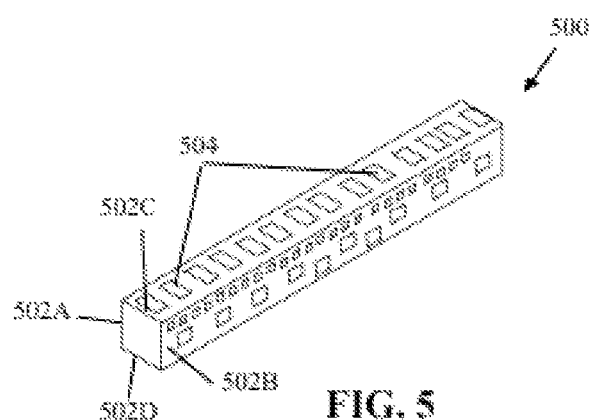
FIG. 5 is an illustration of an exemplary repeater device with a heat sink, in accordance with an exemplary embodiment of the disclosure.

FIG. 5 is an illustration of an exemplary repeater device with a heat sink, in accordance with an exemplary embodiment of the disclosure. With reference to FIG. 5, there is shown a repeater device 500. The repeater device 500 may correspond to the repeater device 104 of the integrated repeater system 102 of FIGS. 1 and 2A to 2C. In this case, the repeater device 500 may has an elongated rectangular box-like structure having four surfaces, where a first surface 502A may be opposite a second surface 502B, and a third surface 502C may be opposite a fourth surface 502D. The first surface 502A and the second surface 502B correspond to the first surface 108A and the second surface 108B respectively (FIG. 1). The repeater device 500 may further include a heat sink 504. The heat sink 504 acts a thermal conductor that dissipates the heat generated by the repeater device 500, thereby allowing regulation of the temperature of the repeater device 104 at levels suitable for functioning of the repeater device 500. In some embodiments, one or more integrated phased array antenna transceivers may be arranged at the first surface 502A and the second surface 502B. In some embodiments, one or more integrated phased array antenna transceivers may be arranged at the first surface 502A and the second surface 502B. In some embodiments, one or more phased array antenna receivers and one or more phased array antenna transmitters may be arranged as separate hardware modules at the first surface 502A and the second surface 502B.

In accordance with an embodiment, the integrated repeater system 102 may be referred to as one-sided repeater system as only one repeater device, such as the repeater device 500, may be arranged at one exterior side of the glass structure 114 (FIG. 1). In accordance with another embodiment, in the integrated repeater system 102, one repeater device, such as the repeater device 500, may be arranged within the glass structure 114 in the air gap 120.

Figure 6:
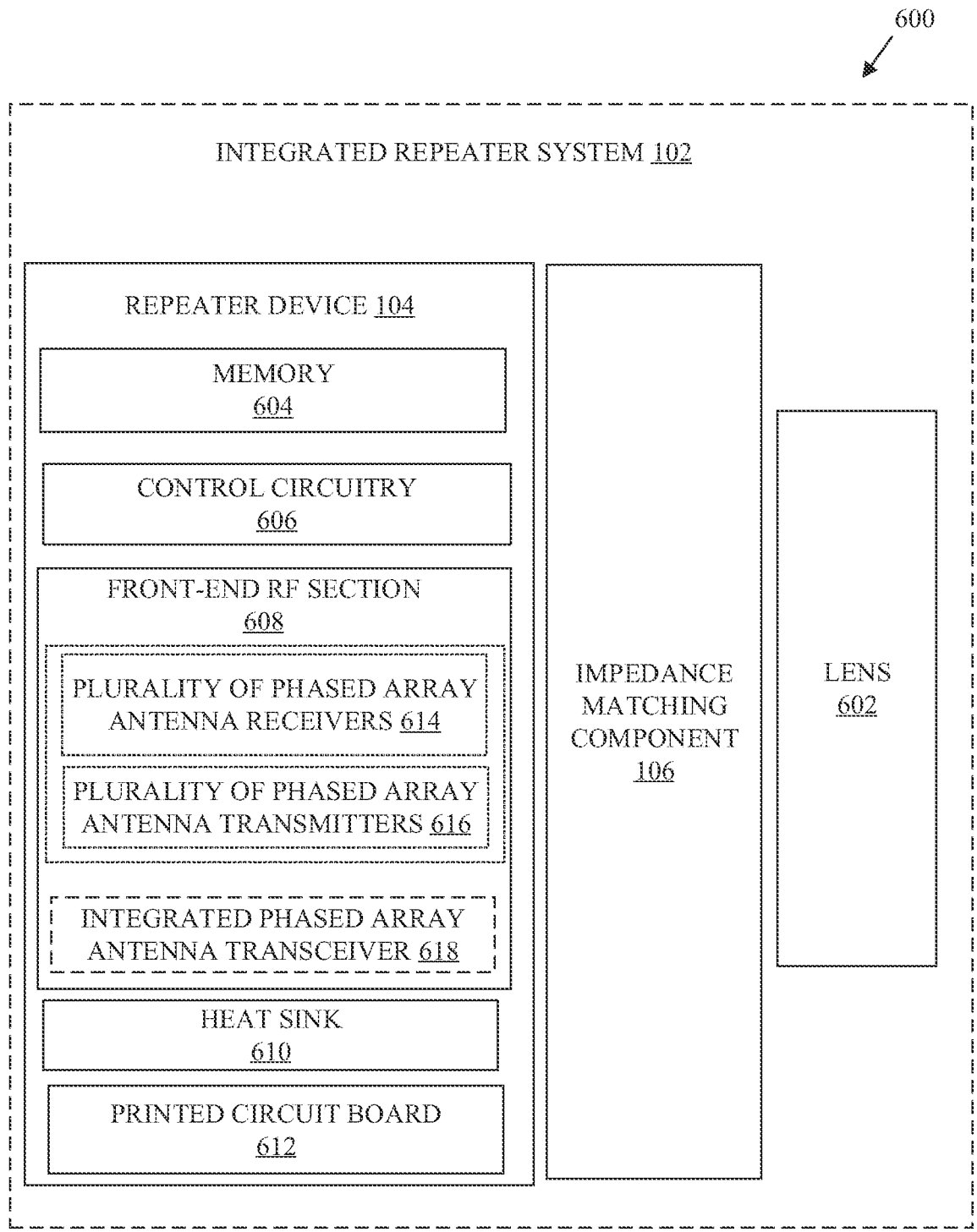
FIG. 6 is a block diagram illustrating various components of an exemplary integrated repeater system, in accordance with an exemplary embodiment of the disclosure.

FIG. 6 is a block diagram illustrating various components of an exemplary integrated repeater system, in accordance with an exemplary embodiment of the disclosure. FIG. 6 is explained in conjunction with elements from FIGS. 1, 2A to 2C, 3, 4, and 5. With reference to FIG. 6, there is shown a block diagram 600 of the integrated repeater system 102. The integrated repeater system 102 may include the repeater device 104, the impedance matching component 106, a lens 602. The repeater device 104 may include a memory 604, a control circuitry 606, a front-end radio frequency (RF) section 608, a heat sink 610, and one or more printed circuit boards, such as a printed circuit board 612. In an implementation, the front-end RF section 608 may include a plurality of phased array antenna receivers 614, and a plurality of phased array antenna transmitters 616. Alternatively, in another implementation, the front-end RF section 608 may include one or more integrated phased array antenna transceivers, such as an integrated phased array antenna transceiver 618.

The lens 602 may be one of: the lens 202 (FIG. 2A), the lens 204 (FIG. 2B), or the lens 206 (FIG. 2C). The lens 602 may be made of Teflon, glass, or plastic material. The lens 602 when arranged at the glass structure 114 not only increases the scanning range of the repeater device 104, but also increases an antenna gain while maintaining no transmission loss at the frequency of the transmitted mmWave radio frequency signal, the second level of transmission loss that is less than the first level of transmission loss, or the third level of transmission loss that is less than the first level of transmission loss and the second level of transmission loss.

The memory 604 may include suitable logic, circuitry, and/or interfaces that may be configured to store instructions executable by the control circuitry 606. The memory 604 may be configured to store values of transmission loss, values of impedance matching, antenna gain, and scanning angle, and the like. Examples of implementation of the memory 604 may include, but not limited to, a random access memory (RAM), a dynamic random access memory (DRAM), a static random access memory (SRAM), a processor cache, a thyristor random access memory (T-RAM), a zero-capacitor random access memory (Z-RAM), a read only memory (ROM), a hard disk drive (HDD), a secure digital (SD) card, a flash drive, cache memory, and/or other non-volatile memory. It is to be understood by a person having ordinary skill in the art that the repeater device 104 may further include one or more other components, such as analog to digital converters (ADCs), digital to analog circuitry (DAC), a LTE modem, and the like, known in the art, which are omitted for brevity.

The control circuitry 606 may be configured to control various components of the integrated repeater system 102. The control circuitry 606 may be configured to tune an impedance of the one or more phased array antenna transmitters (e.g. the plurality of phased array antenna transmitters 616) in accordance with the glass structure 114, based on the impedance matching component 106. Example of the implementation of the control circuitry 606 may include, but are not limited to a digital signal processor, an embedded processor, a microcontroller, a specialized DSP, a Reduced Instruction Set Computing (RISC) processor, an Application-Specific Integrated Circuit (ASIC) processor, a Complex Instruction Set Computing (CISC) processor, and/or other processors, or circuitry.

The plurality of phased array antenna receivers 614 may correspond to the one or more phased array antenna receivers (i.e. the first phased array antenna receiver 110A, the second phased array antenna receiver 110B, the third phased array antenna receiver 110C, and the fourth phased array antenna receiver 110D of FIG. 1). The plurality of phased array antenna transmitters 614 may correspond to the one or more phased array antenna transmitters (such as the first phased array antenna transmitter 112A, the second phased array antenna transmitter 112B, the third phased array antenna transmitter 112C, and the fourth phased array antenna transmitter 112D of FIG. 1).

In an implementation, the front-end RF section 608 may include the plurality of phased array antenna receivers 614 and the plurality of phased array antenna transmitters 616. One or more phased array antenna receivers of the plurality of phased array antenna receivers 614 may be arranged on the first surface 108A of the repeater device 104, where the one or more phased array antenna receivers may be configured to receive a mmWave radio frequency signal from the base station 124. One or more phased array antenna transmitters of the plurality of phased array antenna transmitters 616 may be arranged at the second surface 108B, where the one or more phased array antenna transmitters are configured to transmit the received mmWave radio frequency signal through the glass structure 114 to the UE 126. Moreover, one or more phased array antenna receivers of the plurality of phased array antenna receivers 614 may be further arranged on the second surface 108B of the repeater device 104, where the one or more phased array antenna receivers may be configured to receive a mmWave radio frequency signal from the UE 126 through the glass structure 114 in an uplink communication towards the base station 124. Similarly, one or more phased array antenna transmitters of the plurality of phased array antenna transmitters 616 may be further arranged at the first surface 108A, where the one or more phased array antenna transmitters are configured to transmit a mmWave radio frequency signal received from the UE 126 to the base station 124 in the uplink communication. An exemplary implementation of the plurality of phased array antenna receivers 614 and the plurality of phased array antenna transmitters 616 as separate hardware modules has been described in FIG. 3.

In another implementation, one or more phased array antenna receivers (e.g. the plurality of phased array antenna receivers 614) and one or more phased array antenna receivers (e.g. the plurality of phased array antenna transmitters 616) may be integrated as the integrated phased array antenna transceiver 618. In other words, the front-end RF section 608 may include one or more integrated phased array antenna transceivers, such as the integrated phased array antenna transceiver 618, where a signal receiving function and a signal transmitting function may be shared (or distributed) among the array of antenna elements of the integrated phased array antenna transceiver 618. An exemplary integrated phased array antenna transceiver 404 has been described, for example, in FIG. 4.

In accordance with an embodiment, the front-end RF section 608 may include include a cascading receiver and transmitter chain comprising various components (e.g., an antenna array, a set of low noise amplifiers (LNA), a set of shared front end phase shifters, and a set of power combiners, a set of power dividers, a set of power amplifiers (PA), for beam reception and transmission (not shown for brevity). In accordance with an embodiment, the front-end RF section 608 may receive one or more beams of input RF signals and transmit the one or more beams of output RF signals in accordance with multiple-input multiple-output (MIMO) reception and transmission.

The heat sink 610 refers to a thermal conductor that dissipates away the heat generated by the repeater device 104, thereby allowing regulation of the temperature of the repeater device 104 at levels suitable for functioning of the repeater device 104. An exemplary heat sink (e.g. the heat sink 504), has been described in FIG. 5.

The one or more printed circuit boards, such as the printed circuit board 612, may be a single layer or a multi-layer printed circuit board. The printed circuit board 612 may be made of Silicon, Benzocyclobutane, Nylon, or FR-4 etc. The one or more layers of the printed circuit board 612 may include metallic feeding lines (electrical conductors) to provide current (i.e. to excite) to a subset of antenna elements of one or more phased array antenna transmitters of the plurality of phased array antenna transmitters 616.

Figure 7:
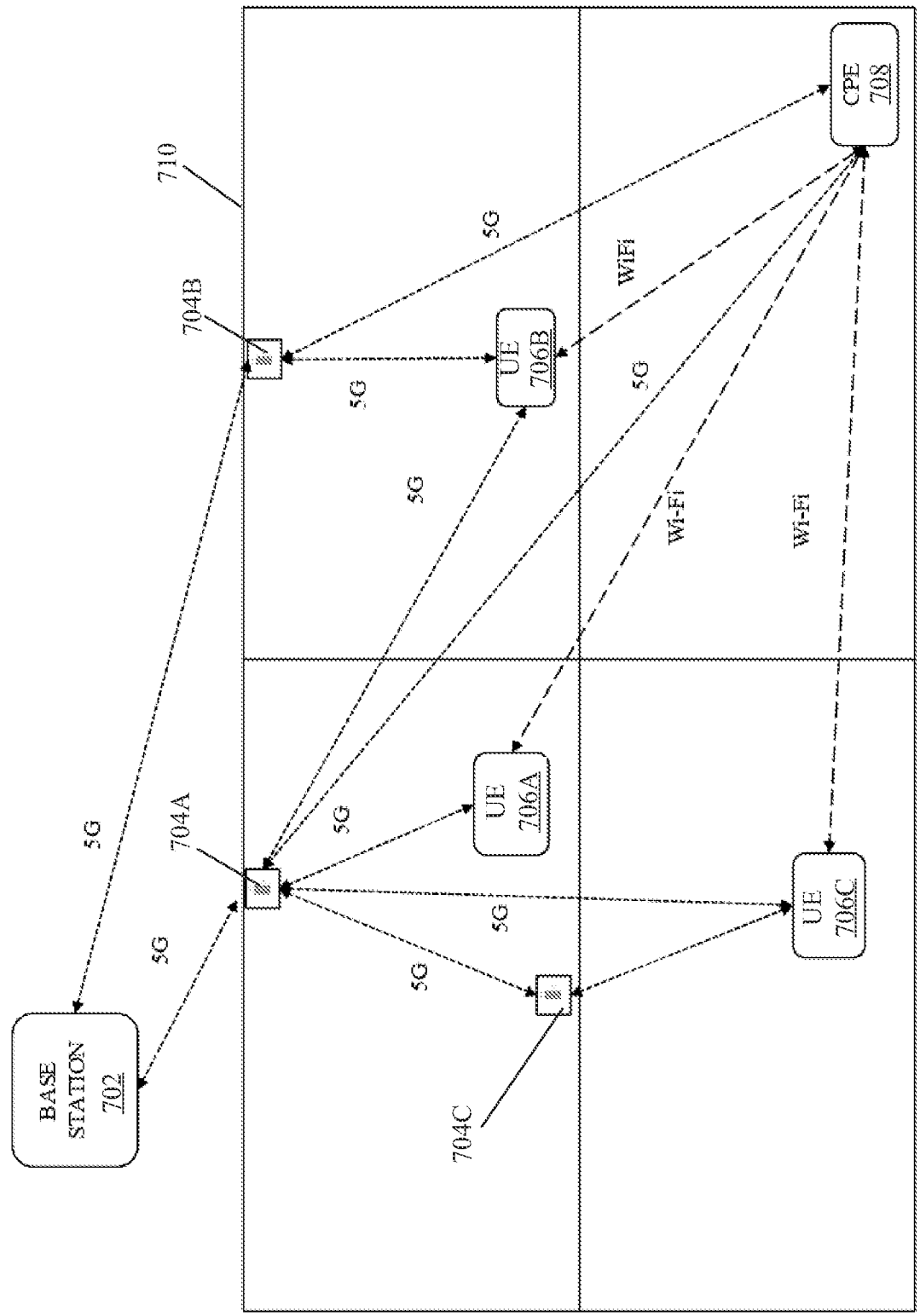
FIG. 7 is an illustration of an exemplary scenario of implementation of an exemplary integrated repeater system for high network performance, in accordance with an exemplary embodiment of the disclosure.

FIG. 7 is an illustration of an exemplary scenario of implementation of an exemplary integrated repeater system for high network performance, in accordance with an exemplary embodiment of the disclosure. With reference to FIG. 7, there is shown an exemplary scenario 700 that includes a base station 702, integrated repeater systems 704A, 704B, and 704C, user equipment (UE) 706A, 706B, 706C, and a customer premise equipment (CPE) 708. The integrated repeater systems 704A, 704B, and 704C may be attached on (or positioned near) low-e double-glazed window panes (e.g. the glass structure 114 of FIG. 1) of a building 710, in which the UEs 706A, 706B, 706C, and the CPE 708 may be present. The base station 702 may correspond to the base station 124 (FIG. 1). Each of the UEs 706A, 706B, 706C correspond to the UE 126. Each of the integrated repeater systems 704A, 704B, and 704C correspond to the integrated repeater system 102.

In accordance with the exemplary scenario 700, each of the UEs 706A, 706B, 706C may be configured to communicate with the base station 702 using 5G cellular communication through corresponding integrated repeater systems 704A, 704B, and 704C, or the CPE 808. Alternatively, the each of the UEs 706A, 706B, 706C may be configured to communicate with the base station 702 communication through the CPE 708 using Wi-Fi (communication shown by long-dash double-sided arrow). Each of the integrated repeater systems 704A, 704B, and 704C improves the network performance and enables multi gigabit data communication with almost negligible transmission loss due to the low-e double-glazed window panes (e.g. the glass structure 114 of FIG. 1).

Figure 8:
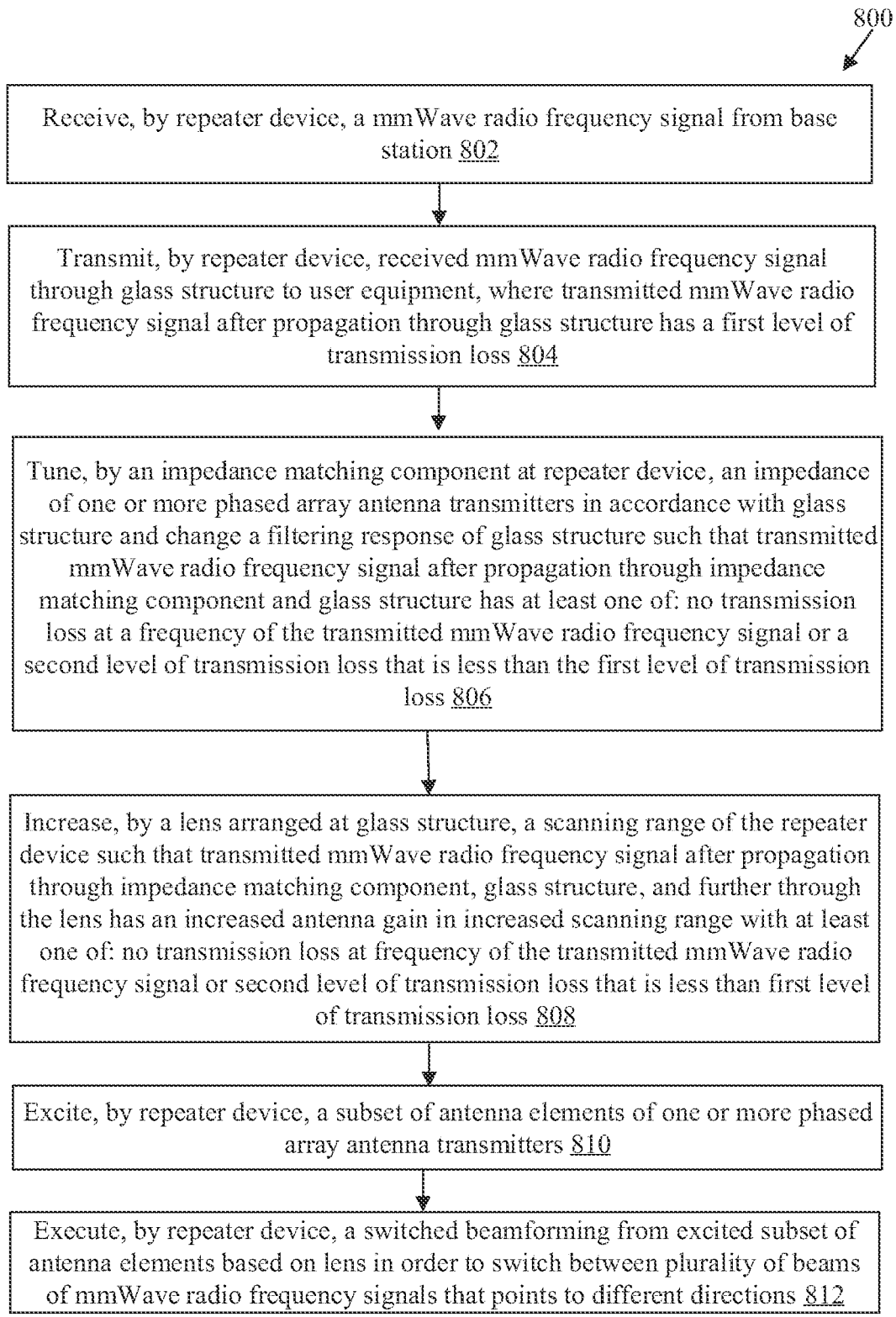
FIG. 8 is a flow chart that illustrates an exemplary method to operate an integrated repeater system for high network performance, in accordance with an embodiment of the disclosure.

FIG. 8 is a flow chart that illustrates an exemplary method to operate an integrated repeater system for high network performance, in accordance with an embodiment of the disclosure. FIG. 8 is explained in conjunction with elements from FIGS. 1, 2A to 2C, and 3 to 7. With reference to FIG. 8, there is shown a flowchart 800 comprising exemplary operations 802 through 810 by the integrated repeater system 102.

At 802, a mmWave radio frequency signal may be received by the repeater device 104 from the base station 124. In an implementation, the one or more phased array antenna receivers at the first surface 108A of the repeater device 104 may be configured to receive the mmWave radio frequency from the base station 124. In another implementation, one or more first phased array antenna transceivers (e.g. the integrated phased array antenna transceiver 404 or the integrated phased array antenna transceiver 618) at the first surface 108A of the repeater device 104 may be configured to receive the mmWave radio frequency from the base station 124.

At 804, the received mmWave radio frequency signal may be transmitted by the repeater device through the glass structure 114 to the user equipment (UE) 126, where the transmitted mmWave radio frequency signal after propagation through the glass structure 114 has a first level of transmission loss. In an implementation, the one or more phased array antenna transmitters at the second surface 108B of the repeater device 104 may be configured to transmit the received mmWave radio frequency to the UE 126. In another implementation, one or more second integrated phased array antenna transceivers (e.g. the integrated phased array antenna transceiver 404 or the integrated phased array antenna transceiver 618) at the second surface 108B of the repeater device 104 may be configured to transmit the received mmWave radio frequency to the UE 126.

At 806, an impedance of the one or more phased array antenna transmitters may be tuned by the impedance matching component 106 at the repeater device 104 in accordance with the glass structure 114 and a filter response of the glass structure 114 may be changed such that the transmitted mmWave radio frequency signal after propagation through the impedance matching component 106 and the glass structure 114 has at least one of: no transmission loss at a frequency of the transmitted mmWave radio frequency signal or a second level of transmission loss that may be less than the first level of transmission loss. In an implementation, the control circuitry 606 may be configured to tune the impedance of the one or more phased array antenna transmitters in accordance with the glass structure 114 based on the impedance matching component 106. The impedance matching component 106 may be configured to change the filter response of the glass structure 114.

At 808, a scanning range of the repeater device 104 may be increased by the lens 602 arranged at the glass structure 114 such that the transmitted mmWave radio frequency signal after propagation through the impedance matching component 106, the glass structure 114, and further through the lens 602 has an increased antenna gain in the increased scanning range with at least one of: no transmission loss at the frequency of the transmitted mmWave radio frequency signal or the second level of transmission loss that may be less than the first level of transmission loss.

At 810, a subset of antenna elements of the one or more phased array antenna transmitters may be excited by the repeater device 104. The control circuitry 606 of the repeater device 104 may be further configured to excite the subset of antenna elements of the one or more phased array antenna transmitters.

At 812, a switched beamforming may be executed by the repeater device 104 from the excited subset of antenna elements based on the lens 602 in order to switch between a plurality of beams of mmWave radio frequency signals that points to different directions. The control circuitry 606 of the repeater device 104 may be further configured to execute the switched beamforming from the excited subset of antenna elements based on the lens 602 in order to switch between the plurality of beams of mmWave radio frequency signals that points to different directions.

Various embodiments of the disclosure may provide a non-transitory computer-readable medium having stored thereon, computer implemented instructions that when executed by a communication device (e.g. the integrated repeater system 102) causes the communication device execute operations to receive a mmWave radio frequency signal from the base station 124; transmit the received mmWave radio frequency signal through the glass structure 114 to the user equipment 126, where the transmitted mmWave radio frequency signal after propagation through the glass structure 114 has a first level of transmission loss; tune, by the impedance matching component 106 at the communication device, an impedance of the one or more phased array antenna transmitters in accordance with the glass structure 114 and change a filter response of the glass structure 114 such that the transmitted mmWave radio frequency signal after propagation through the impedance matching component 106 and the glass structure 114 has at least one of: no transmission loss at a frequency of the transmitted mmWave radio frequency signal or a second level of transmission loss that may be less than the first level of transmission loss; and increase, by the lens 602 arranged at the glass structure 114, a scanning range of the communication device such that the transmitted mmWave radio frequency signal after propagation through the impedance matching component, the glass structure, and further through the lens has an increased antenna gain in the increased scanning range with at least one of: no transmission loss at the frequency of the transmitted mmWave radio frequency signal or the second level of transmission loss that may be less than the first level of transmission loss.

Various embodiments of the disclosure may provide the integrated repeater system 102 (FIG. 1). The integrated repeater system 102 comprises the repeater device 104 having the first surface 108A and the second surface 108B that is opposite the first surface 108A. The repeater device 104 may comprise one or more phased array antenna receivers and one or more phased array antenna transmitters. The one or more phased array antenna receivers are arranged on the first surface 108A and are configured to receive a mmWave radio frequency signal from the base station 124. The one or more phased array antenna transmitters are arranged on the second surface 108B, and are configured to transmit the received mmWave radio frequency signal through the glass structure 114 to the user equipment 126, and where the transmitted mmWave radio frequency signal after propagation through the glass structure 114 has a first level of transmission loss. The integrated repeater system 102 further comprises the impedance matching component 106 having a dielectric property is arranged between the second surface 108B and the glass structure 114. The repeater device 104 further comprises the control circuitry 606 configured to tune an impedance of the one or more phased array antenna transmitters in accordance with the glass structure 114, based on the impedance matching component 106. The impedance matching component 106 may be configured to change a filter response of the glass structure 114 such that the transmitted mmWave radio frequency signal after propagation through the impedance matching component 106 and the glass structure 114 has at least one of: no transmission loss at a frequency of the transmitted mmWave radio frequency signal or a second level of transmission loss that is less than the first level of transmission loss.

In accordance with an embodiment, the integrated repeater system 102 may further comprise the lens 602. In accordance with an embodiment, the glass structure 114 may be a low-emissivity double-glazed structure having two layers of glass with an air gap 120 between the two layers of glass, where the first layer 116 of the two layers of glass has the first outer surface 116A facing the second surface 108B of the repeater device 104 and the first inner surface 116B facing the air gap 120, and where the second layer 118 of glass has the second outer surface 118A facing the lens 602 (e.g. the lens 202) and the second inner surface 118B facing the first inner surface 116B, where the lens 602 (e.g. the lens 202) is arranged on the second outer surface 118B, and where the transmitted mmWave radio frequency signal after propagation through the impedance matching component 106 and the glass structure 114 further passes through the lens 602 (e.g. the lens 202).

In accordance with an embodiment, the lens 602 (e.g. the lens 204) may be arranged in the air gap 120 between the first inner surface 116B and the second inner surface 118B.

In accordance with an embodiment, the lens 602 (e.g. the lens 206) may be integrated or patterned in at least one of the two layers of glass of the glass structure 114. In accordance with an embodiment, the control circuitry 606 may be further configured to excite a subset of antenna elements of the one or more phased array antenna transmitters; and execute a switched beamforming from the excited subset of antenna elements based on the lens in order to switch between a plurality of beams of mmWave radio frequency signals that points to different directions. In accordance with an embodiment, the lens 602 is arranged at the glass structure such that a scanning range of the one or more phased array antenna transmitters is increased for the execution of the switched beamforming. The one or more phased array antenna receivers and one or more phased array antenna transmitters are integrated into the phased array antenna transceiver 404 (or the phased array antenna transceiver 618) that comprises the array of antenna elements 406, where the control circuitry 606 may be configured to distribute a signal receiving function and a signal transmitting function among the array of antenna elements 406.

Various embodiments of the disclosure may provide another integrated repeater system 200A, 200B, or 200C (FIG. 2A, 2B, or 2C). The integrated repeater system 200A, 200B, or 200C comprises the repeater device 104 having the first surface 108A and the second surface 108B that is opposite the first surface 108A. The repeater device 104 may comprise one or more phased array antenna receivers and one or more phased array antenna transmitters. The one or more phased array antenna receivers are arranged on the first surface 108A and are configured to receive a mmWave radio frequency signal from the base station 124. The one or more phased array antenna transmitters are arranged on the second surface 108B, and are configured to transmit the received mmWave radio frequency signal through the glass structure 114 to the user equipment 126, and where the transmitted mmWave radio frequency signal after propagation through the glass structure 114 has a first level of transmission loss. The integrated repeater system 102 further comprises the impedance matching component 106 having a dielectric property is arranged between the second surface 108B and the glass structure 114. The repeater device 104 further comprises the control circuitry 606 configured to tune an impedance of the one or more phased array antenna transmitters in accordance with the glass structure 114, based on the impedance matching component 106. The impedance matching component 106 may be configured to change a filter response of the glass structure 114 such that the transmitted mmWave radio frequency signal after propagation through the impedance matching component 106 and the glass structure 114 has at least one of: no transmission loss at a frequency of the transmitted mmWave radio frequency signal or a second level of transmission loss that is less than the first level of transmission loss. The integrated repeater system 200A, 200B, or 200C may further comprise the lens 602 arranged at the glass structure 114.

While various embodiments described in the present disclosure have been described above, it should be understood that they have been presented by way of example, and not limitation. It is to be understood that various changes in form and detail can be made therein without departing from the scope of the present disclosure. In addition to using hardware (e.g., within or coupled to a central processing unit ("CPU"), microprocessor, micro controller, digital signal processor, processor core, system on chip ("SOC") or any other device), implementations may also be embodied in software (e.g. computer readable code, program code, and/or instructions disposed in any form, such as source, object or machine language) disposed for example in a non-transitory computer-readable medium configured to store the software. Such software can enable, for example, the function, fabrication, modeling, simulation, description and/or testing of the apparatus and methods describe herein. For example, this can be accomplished through the use of general program languages (e.g., C, C++), hardware description languages (HDL) including Verilog HDL, VHDL, and so on, or other available programs. Such software can be disposed in any known non-transitory computer-readable medium, such as semiconductor, magnetic disc, or optical disc (e.g., CD-ROM, DVD-ROM, etc.). The software can also be disposed as computer data embodied in a non-transitory computer-readable transmission medium (e.g., solid state memory any other non-transitory medium including digital, optical, analog-based medium, such as removable storage media). Embodiments of the present disclosure may include methods of providing the apparatus described herein by providing software describing the apparatus and subsequently transmitting the software as a computer data signal over a communication network including the internet and intranets.

It is to be further understood that the system described herein may be included in a semiconductor intellectual property core, such as a microprocessor core (e.g., embodied in HDL) and transformed to hardware in the production of integrated circuits. Additionally, the system described herein may be embodied as a combination of hardware and software. Thus, the present disclosure should not be limited by any of the above-described exemplary embodiments, but should be defined only in accordance with the following claims and their equivalents.

What is claimed is:

1. An integrated repeater system, comprising:
a repeater device having a first surface and a second surface that is opposite the first surface,
wherein the repeater device comprises one or more phased array antenna receivers and one or more phased array antenna transmitters,
wherein the one or more phased array antenna receivers are arranged on the first surface and are configured to receive a mmWave radio frequency signal from a base station,
wherein the one or more phased array antenna transmitters are arranged on at the second surface or the first surface, and are configured to transmit the received mmWave radio frequency signal through a glass structure to a user equipment, and
wherein the transmitted mmWave radio frequency signal after propagation through the glass structure; and
an impedance matching component having a dielectric property is arranged between the second surface and the glass structure,
wherein the impedance matching component is configured to change a filtering response of the glass structure based on the dielectric property of the impedance matching component.

2. The integrated repeater system according to claim 1, further comprises a lens.

3. The integrated repeater system according to claim 2, where the glass structure is a low-emissivity double-glazed structure having two layers of glass with an air gap between the two layers of glass, wherein a first layer of the two layers of glass has a first outer surface facing the second surface of the repeater device and a first inner surface facing the air gap, and wherein a second layer of glass has a second outer surface facing the lens and a second inner surface facing the first inner surface, wherein the lens is arranged on the second outer surface, and wherein the transmitted mmWave radio frequency signal after propagation through the impedance matching component and the glass structure further passes through the lens.

4. The integrated repeater system according to claim 2, where the glass structure is a low-emissivity double-glazed structure having two layers of glass with an air gap between the two layers of glass, wherein a first layer of the two layers of glass has a first outer surface facing the second surface of the repeater device and a first inner surface facing the air gap, and wherein a second layer of glass has a second outer surface and a second inner surface facing the air gap and the first inner surface, wherein the lens is arranged in the air gap between the first inner surface and the second inner surface.

5. The integrated repeater system according to claim 2, where the glass structure is a low-emissivity double-glazed structure having two layers of glass with an air gap between the two layers of glass, wherein a first layer of the two layers of glass has a first outer surface facing the second surface of the repeater device and a first inner surface facing the air gap, and wherein a second layer of glass has a second outer surface and a second inner surface facing the air gap and the first inner surface, wherein the lens is integrated or patterned in at least one of the two layers of glass of the glass structure.

6. The integrated repeater system according to claim 2, wherein the repeater device further comprises control circuitry configured to tune an impedance of the one or more phased array antenna transmitters in accordance with the glass structure,
wherein the control circuitry is further configured to:
excite a subset of antenna elements of the one or more phased array antenna transmitters; and
execute a switched beamforming from the excited subset of antenna elements based on the lens in order to switch between a plurality of beams of mmWave radio frequency signals that points to different directions.

7. The integrated repeater system according to claim 6, wherein the lens is arranged at the glass structure such that a scanning range of the one or more phased array antenna transmitters is increased for the execution of the switched beamforming.

8. The integrated repeater system according to claim 1, wherein the dielectric property of the impedance matching component corresponds to a dielectric constant that is in a range of 2 to 4.

9. The integrated repeater system according to claim 1, wherein the repeater device further comprises a printed circuit board and a heat sink.

10. The integrated repeater system according to claim 1, wherein the one or more phased array antenna receivers and one or more phased array antenna transmitters are integrated into one phased array antenna transceiver that comprises an array of antenna elements, wherein the repeater device is further configured to distribute a signal receiving function and a signal transmitting function among the array of antenna elements.

11. An integrated repeater system, comprising:
a repeater device having a first surface and a second surface that is opposite the first surface,
wherein the repeater device comprises one or more phased array antenna receivers and one or more phased array antenna transmitters,
wherein the one or more phased array antenna receivers are arranged on the first surface and are configured to receive a mmWave radio frequency signal from a base station,
wherein the one or more phased array antenna transmitters are arranged on the second surface or the first surface, and are configured to transmit the received mmWave radio frequency signal through a glass structure to a user equipment, and
wherein the transmitted mmWave radio frequency signal after propagation through the glass structure;
an impedance matching component having a dielectric property is arranged between the second surface and the glass structure, and
wherein the impedance matching component is configured to change a filtering response of the glass structure based on the dielectric property of the impedance matching component; and
a lens arranged at the glass structure.

12. The integrated repeater system according to claim 11, where the glass structure is a low-emissivity double-glazed structure having two layers of glass with an air gap between the two layers of glass, wherein a first layer of the two layers of glass has a first outer surface facing the second surface of the repeater device and a first inner surface facing the air gap, and wherein a second layer of glass has a second outer surface facing the lens and a second inner surface facing the first inner surface, wherein the lens is arranged on the second outer surface, and wherein the transmitted mmWave radio frequency signal after propagation through the impedance matching component and the glass structure further passes through the lens.

13. The integrated repeater system according to claim 11, where the glass structure is a low-emissivity double-glazed structure having two layers of glass with an air gap between the two layers of glass, wherein a first layer of the two layers of glass has a first outer surface facing the second surface of the repeater device and a first inner surface facing the air gap, and wherein a second layer of glass has a second outer surface and a second inner surface facing the air gap and the first inner surface, wherein the lens is arranged in the air gap between the first inner surface and the second inner surface.

14. The integrated repeater system according to claim 11, where the glass structure is a low-emissivity double-glazed structure having two layers of glass with an air gap between the two layers of glass, wherein a first layer of the two layers of glass has a first outer surface facing the second surface of the repeater device and a first inner surface facing the air gap, and wherein a second layer of glass has a second outer surface and a second inner surface facing the air gap and the first inner surface, wherein the lens is integrated or patterned in at least one of the two layers of glass of the glass structure.

15. The integrated repeater system according to claim 11, wherein the repeater device further comprises control circuitry configured to tune an impedance of the one or more phased array antenna transmitters in accordance with the glass structure,
wherein the control circuitry is further configured to:
excite a subset of antenna elements of the one or more phased array antenna transmitters; and
execute a switched beamforming from the excited subset of antenna elements based on the lens in order to switch between a plurality of beams of mmWave radio frequency signals that points to different directions.

16. The integrated repeater system according to claim 15, wherein the lens is arranged at the glass structure such that a scanning range of the one or more phased array antenna transmitters is increased for the execution of the switched beamforming.

17. The integrated repeater system according to claim 11, wherein the one or more phased array antenna receivers and one or more phased array antenna transmitters are integrated into one phased array antenna transceiver that comprises an array of antenna elements, wherein the repeater device is further configured to distribute a signal receiving function and a signal transmitting function among the array of antenna elements.

18. The integrated repeater system according to claim 17, wherein the integrated one phased array antenna transceiver is arranged at the first surface of the repeater device.

19. A method to operate an integrated repeater system, the method comprising:
   receiving, by a repeater device, a mmWave radio frequency signal from a base station;
   transmitting, by the repeater device, the received mmWave radio frequency signal through a glass structure to a user equipment, and wherein the transmitted mmWave radio frequency signal after propagation through the glass structure;
   change, by the repeater device, a filtering response of the glass structure based on a dielectric property of an impedance matching component of the integrated repeater system; and
   using a lens arranged at the glass structure to increase a scanning range of the repeater device.

20. The method according to claim 19, further comprising:
   exciting, by the repeater device, a subset of antenna elements of the one or more phased array antenna transmitters; and
   executing, by the repeater device, a switched beamforming from the excited subset of antenna elements based on the lens in order to switch between a plurality of beams of mmWave radio frequency signals that points to different directions.

* * * * *